United States Patent [19]

Hazen et al.

[11] Patent Number: 4,906,741
[45] Date of Patent: Mar. 6, 1990

[54] AZO DIMERS CONTAINING THE HEXAFLUOROISOPROPYLIDENE GROUP

[75] Inventors: James R. Hazen, Coventry; William R. Lee, East Providence, both of R.I.

[73] Assignee: Hoechst Celanese Corporation, Somerville, N.J.

[21] Appl. No.: 280,087

[22] Filed: Dec. 5, 1988

Related U.S. Application Data

[63] Continuation-in-part of Ser. No. 105,857, Oct. 8, 1987.

[51] Int. Cl.⁴ .................... C07C 107/06; C09B 27/00; C09B 46/00
[52] U.S. Cl. .................................. 534/856; 534/587; 534/839; 534/843; 534/887; 564/330
[58] Field of Search ........................ 534/856, 843, 839

*Primary Examiner*—Floyd D. Higel
*Attorney, Agent, or Firm*—Perman & Green

[57] ABSTRACT

The invention is directed toward compounds having the formula:

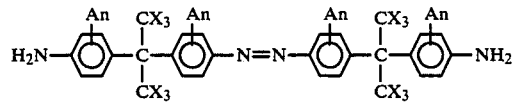

wherein A is a substituent independently selected from the group consisting of lower alkyl having from 1 to 3 carbon atoms, chloro or fluoro; n is an integer independently selected from 0 to 2; and X is a halogen selected from the group consisting of chloro and fluoro.

Compounds of this invention are useful as intermediates in the preparation of the corresponding diamine compounds resulting from the reductive cleavage of the azo linkage. They may also be used to prepare dyestuffs and photosensitive materials.

4 Claims, No Drawings

AZO DIMERS CONTAINING THE HEXAFLUOROISOPROPYLIDENE GROUP

BACKGROUND OF THE INVENTION

This application is a Continuation-In-Part of applicants' copending application Ser. No. 105857, filed Oct. 8, 1987.

The aromatic diamine 2,2-bis(4-aminophenyl)hexaflurorpropane is a known product which is useful in the preparation of polyimides and polyamides. These polymers are known in the literature; see e.g. U.S. Pat. Nos. 3,356,648 and 3,328,352. These polymers possess high thermal stability, enhanced light transparency, and improved processing characteristics. These properties give such polymers application in areas where high service temperature stability is required, such as aircraft composites and high temperature shaped parts and films. They are prepared by reacting the aromatic diamine with a dianhydride or dicarboxylic acid chloride to produce the polyimide or polyamide, respectively.

The literature describes several methods to prepare the 2,2-bis(4-aminophenyl)hexafluoropropane intermediate. U.S. Pat. No. 3,328,352 teaches its preparation by the direct condensation of aniline with hexafluoroacetone in the presence of an aluminum chloride catalyst. The reaction conditions are severe and the reported yield is very low—approximately 26 percent.

Another literature preparation is reported in Chemical Abstracts, 65, 185236. This method involves the application of the Curtius rearrangement of the diacyl azide prepared from the corresponding dicarboxylic acid chloride; i.e., 2,2-bis-(4-chlorocarbonylphenyl)hexafluropropane. However, here again the reported yield is low-only 42 percent.

Another literature preparation is reported in U.S. Pat. No. 3,310,573. This method involves the application of the Schmidt reaction [R. F. Schmidt, Ber., 57, 704 (1924)] on the 2,2-bis(4-carboxylphenyl)hexafluoropropane. Here, the dicarboxylic acid is reacted with hydrazoic acid to give the desired diamine directly. The yield again is reported "poor" with no specific value reported.

The low yields of the above literature reports apparently prompted another approach to produce the desired diamine. Lau et al., [J. Polymer Science, Polymer Chemistry Edition, 20, 2381 (1982)] reported its preparation from 2,2-bis(4-hydroxyphenyl)-hexafluoropropane. Here, the commercially available dihydroxy compound was reacted with 2-chloro-4-phenylquinazoline to give the bis quinazoline condensation product which was then thermally rearranged to the quinazolinone which was then hydrolzyed to the diamine. Again, the reported yield was low—just 16.5 percent. In addition the method requires severe reaction conditions and a chromatographic purification of the product which is not readily adapted to a commercial manufacturing process.

Applicants copending application Ser. No. 105,857 discloses an improved process for producing 2,2-bis-(4-aminophenyl) - hexahalopropanes. This process was conceived as a consequence of the discovery that the Hofmann reaction as applied to the corresponding diamide precursor yielded a mixture of the expected diamine and a substantial portion of a novel dimeric azo material, which mixture is then reduced to form the diamine in high yield.

Accordingly, it is an object of this invention to provide a novel azo dimer useful as an intermediate in the synthesis of 2,2-bis-(4-aminophenyl) - hexahalopropanes.

It is another object of this invention to produce high purity 2,2-bis(4-aminophenyl)hexafluoropropane in high yield from the dimeric azo material of this invention.

SUMMARY OF THE INVENTION

This present invention concerns a novel class of azo dimer materials of the following formula I:

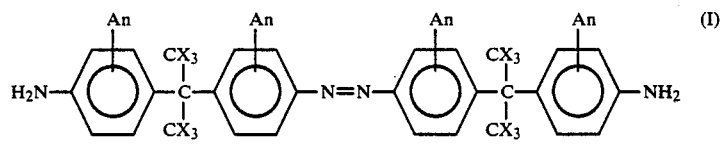

wherein A is a substituent which is independently selected from the group consisting of lower alkyl of 1 to 3 carbons, chloro or fluoro; n is an integer independently selected from 0 to 2; and X is a halogen selected from the group consisting of chloro and fluoro, and their use in the synthesis of aromatic diamines of the following formula II:

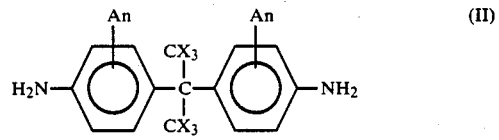

wherein A, n, and X have the same meaning as above. In the most preferred embodiment of the present invention, n is zero and X is fluoro.

The process comprises reacting a 2,2-bis(4-aminocarbonyl)-hexahalopropane of the formula III:

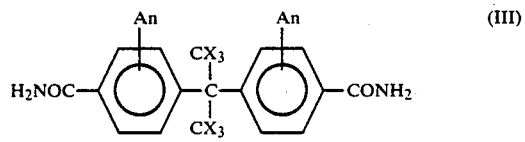

wherein A, n and X have the meanings set forth above, in a Hofmann type reaction with an excess of alkali metal hypohalite to maximize the formation of azo dimer material of the formula I above. This reaction product comprises a mixture of the azo dimer of formula I and the diamine of formula II. The azo dimer may then be separated from the diamine by an aqueous acid extraction of the diamine. The thus isolated azo material may be separately reduced to yield diamines of the formula II or may be used in other applications such as an intermediate in the preparation of dyestuffs or in photosensitive applications.

DETAILED DESCRIPTION OF THE INVENTION

The process of the invention comprises a first step of subjecting the starting amide of formula III to the Hofmann Reaction. The amide is prepared from the known dicarboxylic acid or its acid chloride by conventional techniques; for instance, by reacting the dicarboxylic acid in the presence of ammonia and thermally converting the salt to the amide or forming the acid chloride by reacting the dicarboxylic acid with thionyl chloride, phosphorus trichloride or phosphorous pentachloride, preferably thionyl chloride, and then treating the acid chloride with ammonia; see also March, H., Advanced Organic Chemistry: Reactions, Mechanisms and Structure, 3rd Edition, pages 370–379, John Wiley & Sons, N.Y. (1985). This step of the process is known as the Hofmann Reaction and it has been extensively reviewed in the literature; see e.g. Wallace, E. S. and Lane.; Organic Reactions; Vol. 3, p. 267–306, Hohn Wiley & Sons (1964); Smith, P. A. S. in Molecular Rearrangements, Editor DeMao, P. Chapter 8, Interscience Publishers, N.Y. (1967)1; and A. W. Hofmann, Ber., 14, 2725 (1881)—the teachings of which are hereby incorporated by reference.

The Hofmann Reaction comprises the treatment of an amide with a hypohalite such as sodium hypobromite or sodium hypochlorite in the presence of an alkali metal hydroxide. Preferably sodium hypochlorite is used as it is readily available. Alternately, the hypohalite may be formed in situ from the halogen (chlorine or bromine) in the presence of sodium hydroxide. Preferably, the amount of hypohalite is employed in about a 50% excess of the amount normally used in Hofmann type reactions.

In the presence of the hypohalite, the amide III is converted into a mixture comprising the azo dimer of formula I and the diamine of formula II.

Next, the reaction mixture is adjusted to an almost neutral pH by treatment with a suitable weak acid such a acetic acid, and the slurry is filtered. The moist solid is then dissolved in organic solvent such as methylene chloride, chloroform or toluene, and the diamine component is extracted with an aqueous solution of a strong acid such as hydrochloric acid or sulfuric acid. The azo dimer remaining in organic solution may then be recovered by evaporation of the solution to dryness.

This isolated azo dimer may then be converted to the desired 2,2-bis(4-aminophenyl)propane by subjecting it to reducing conditions under which the azo group is reduced by the sequential addition of hydrogen atoms across the nitrogen to nitrogen double bond to form the hydrazo compound, followed by further reduction, i.e., the addition of hydrogen atoms to the hydrazo compound, to cleave the nitrogen to nitrogen single bond and form the desired diamine. Various methods are known to convert azo compounds to amines, all of which involve a reduction reaction; see generally, Newbold, B. T., "In The Chemistry of the Hydrazo, Azo, and Azoxy Groups," Editor Patia, S., Part II, Chapter 15, John Wiley & Sons, N.Y. (1975). This reference discloses a variety of reduction reactions. Preferably, the reduction is conducted by catalytic hydrogenation; see, Freifelder, M., Practical Catalytic Hydrogenation, Chapter 11, Wiley-Interscience, N.Y. (1971). The above references are hereby incorporated by reference.

The azo dimer of formula I is preferably converted to the diamine of formula II by hydrogenation of the dimer in the presence of nickel or a noble metal catalyst such as palladium, platinum or rhodium. Palladium on a carbon carrier is preferred.

In summary, the process of the invention can be conducted by slurrying the preferred 2,2-bis(4-aminocarbonylphenyl)hexafluoropropane in an excess of aqueous alkali, preferably sodium hydroxide, and treating it with an excess of alkali metal hypohalite, for example, about 3.0 moles of hypohalite per mole of diamide, at about 0° C. to about 25° C., preferably about 15° C. The preferred hypohalite is sodium hypochlorite. After several hours, the homogeneous reaction mixture is gradually allowed to warm to room temperature and then the reaction is finished by warming it to 30°–50° C., preferably about 35°–40° C. for about 10–60 minutes.

It was determined that a preferably effective amount of excess hypohalite reactant is about a 50 molar excess— the theoretical amount being 2 moles of hypohalite per mole of diamide. Higher excesses of the hypohalite are not effective to convert the diamide to significantly higher yields of the azo dimer. In general, the yield of azo dimer by the process of the present invention is approximately 50%. It will be apparent to those skilled in the art to determine the effective amount of hypohalite used in the Hofmann Reaction to convert the diamide to the highest practical yield of azo dimer.

The reaction mixture of azo dimer and diamine is then dissolved in solvent and washed with an aqueous solution of strong acid to dissolve out the diamine leaving the azo dimer in solution. The dimer may be recovered from solution by any suitable process, preferably simple evaporation.

The azo dimer may then be subjected to reducing reaction conditions to convert it to the desired diamine. The reduction is preferably conducted over a palladium-on-carbon catalyst in a hydrogen atmosphere.

The following Examples illustrate this invention:

EXAMPLE 1

Synthesis of Azo Dimer

Into 500 parts of water was added 100 parts by weight of 50% sodium hydroxide and 60 parts by weight of 4,4'-[2,2,2-trifluoro-1-(trifluoromethyl)ethylidene]-bis- benzamide. To this uniform slurry was then added 285 parts by weight of 12% sodium hypochlorite at about 10°–20° C. After stirring several hours the mixture was warmed to 35°–40° C. for one hour and then cooled to 25° C. and treated with about 80 parts by weight of acetic acid to adjust to a pH of 7.5. The slurry was stirred 15 minutes and then filtered and washed with water. The moist solid was then dissolved in 400 parts by weight of methylene chloride and the solution extracted three times with an aqueous acid solution made up from 10 parts by weight of 36% hydrochloric acid in 250 parts by weight of water. The methylene chloride solution was then washed with water, dried over anhydrous magnesium sulfate, and finally evaporated to dryness to yield 25 parts by weight of azo dimer.

EXAMPLE 2

Reduction of Azo Dimer to 2,2-Bis-(4-Aminophenyl)-hexafluoropropane

The azo dimer of Example 1 (25 parts) was dissolved in 250 parts by weight of methanol. Then 1.5 parts by weight of 5% palladium-on-carbon catalyst was added and the mixture was reduced in an autoclave under 350 psig of hydrogen at 100°–120° C. for three hours. The autoclave contents were cooled to 60° C., filtered to separate the catalyst, and drowned into 1000 parts of ice/water, keeping the temperature below 15° C. The product slurry was stirred about one hour and filtered and washed with water to give 24 parts by weight (after drying) of 4,4,-[2,2,2-trifluoro-1-(trifluoromethyl)ethylidene]-bis- benzeneamine. After treatment of an aqueous hydrochloric acid solution of this crude diamine with activated charcoal and reprecipitation with ammonia, there was recovered 21 parts by weight of purified diamine, m.p. 190°–192° C., assay 98.8%, which is identical by thin layer chromatography and infrared and ultraviolet spectra with an authentic sample.

Although the above invention has been described in terms of the preparation of an azo dimer of formula I wherein n is zero and X is fluoro, many different embodiments of the invention may be made without departing from the scope thereof. The hydrogen atoms of the phenylene rings of the azo dimer may be substituted with non-interferring substituents without departing from the scope of the invention; for example, the hydrogen atoms may be replaced with lower alkyl of 1 to 3 carbons or other halogen substituents such as chloro. Similarly, one or more of the fluoro substituents of the linking isopropylidene group may be replaced with chloro substituents; e.g. the starting amide reactant could be 2,2-bis(4-aminocarbonylphenyl)dichlorotetrafluoroisopropane, also known as 2,2-bis(4-benzamido)-dichlorotetrafluoro- propane.

The invention has been described by way of the above specification and illustrative examples and it is to be understood that this invention is not limited to the specific embodiments thereof except as defined by the following claims.

We claim:

1. A compound of the following structure:

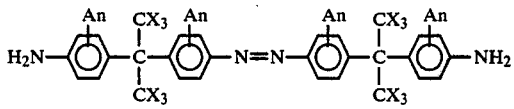

wherein: A is a substitutent independently selected from the group consisting of lower alkyl having from 1 to 3 carbon atoms, chloro or fluoro; n is an integer independently selected from 0 to 2; and X is a halogen selected from the group consisting of chloro and fluoro.

2. The compound of claim 1 wherein X is fluoro.
3. The compound of claim 1 wherein n is zero.
4. The compound of claim 2 wherein n is zero.

* * * * *